United States Patent
Bizub (10) Patent No.: US 10,001,077 B2
(45) Date of Patent: Jun. 19, 2018

(54) METHOD AND SYSTEM TO DETERMINE LOCATION OF PEAK FIRING PRESSURE

(71) Applicant: General Electric Company, Schenectady, NY (US)

(72) Inventor: Jeffrey Jacob Bizub, Milwaukee, WI (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 250 days.

(21) Appl. No.: 14/626,585

(22) Filed: Feb. 19, 2015

(65) Prior Publication Data

US 2016/0245215 A1    Aug. 25, 2016

(51) Int. Cl.
| | |
|---|---|
| *G01L 23/24* | (2006.01) |
| *F02D 41/26* | (2006.01) |
| *F02D 35/02* | (2006.01) |
| *G01L 23/22* | (2006.01) |
| *F02D 41/14* | (2006.01) |

(52) U.S. Cl.
CPC ......... *F02D 41/263* (2013.01); *F02D 35/024* (2013.01); *F02D 35/027* (2013.01); *F02D 41/1498* (2013.01); *G01L 23/221* (2013.01); *G01L 23/225* (2013.01); *F02D 35/028* (2013.01)

(58) Field of Classification Search
CPC .................................................... G01L 23/221
See application file for complete search history.

(56) References Cited

U.S. PATENT DOCUMENTS

| | | | | |
|---|---|---|---|---|
| 3,183,708 | A | * | 5/1965 | Roddick ............... G01L 23/225 73/35.03 |
| 4,491,010 | A | * | 1/1985 | Brandt .................. G01L 23/222 73/35.05 |
| 5,029,565 | A | | 7/1991 | Talbot |
| 5,111,790 | A | | 5/1992 | Grandy |
| 5,115,778 | A | | 5/1992 | Holroyd |
| 5,119,783 | A | | 6/1992 | Komurasski |
| 5,241,480 | A | | 8/1993 | Takaku et al. |
| 5,257,533 | A | | 11/1993 | Imada |

(Continued)

FOREIGN PATENT DOCUMENTS

| | | |
|---|---|---|
| CN | 203480037 | 3/2014 |
| DE | 10233612 A1 | 2/2004 |

(Continued)

OTHER PUBLICATIONS

U.S. Appl. No. 14/639,736, filed Mar. 5, 2015, Jeffrey Jacob Bizub.

(Continued)

*Primary Examiner* — Hezron E Williams
*Assistant Examiner* — Alex Devito
(74) *Attorney, Agent, or Firm* — Fletcher Yoder, P.C.

(57) ABSTRACT

A method or system to determine peak firing pressure of a cylinder of an engine having a crank shaft. The method includes accessing a knock signal received from a knock sensor of the cylinder. The method includes determining a location of peak firing pressure based at least in part on the knock signal. The location of peak firing pressure is associated with combustion of the engine and corresponds to a time or a crank angle of the crankshaft. The method includes generating an indication of the location of peak firing pressure.

20 Claims, 5 Drawing Sheets

(56) References Cited

U.S. PATENT DOCUMENTS

| | | | |
|---|---|---|---|
| 5,337,240 A | 8/1994 | Nakagawa et al. |
| 5,339,245 A | 8/1994 | Hirata et al. |
| 5,361,213 A | 11/1994 | Fujieda et al. |
| 5,392,642 A | 2/1995 | Tao |
| 5,400,648 A | 3/1995 | Mahr |
| 5,452,699 A | 9/1995 | Rossignol |
| 5,467,638 A | 11/1995 | Philipp |
| 5,594,649 A | 1/1997 | Cook et al. |
| 5,693,936 A | 12/1997 | Komachiya et al. |
| 5,763,769 A | 6/1998 | Kluzner |
| 5,837,887 A | 11/1998 | Shibata et al. |
| 5,905,193 A | 5/1999 | Hashizume et al. |
| 5,932,801 A | 8/1999 | Akishita et al. |
| 5,934,256 A | 8/1999 | Wenzlawski et al. |
| 5,996,398 A | 12/1999 | Schleupen et al. |
| 6,104,195 A | 8/2000 | Yoshinaga et al. |
| 6,273,064 B1 | 8/2001 | Scholl et al. |
| 6,276,334 B1 | 8/2001 | Flynn et al. |
| 6,330,877 B1 | 12/2001 | Nordin |
| 6,336,355 B1 | 1/2002 | Sasaki et al. |
| 6,550,311 B2 | 4/2003 | Sloboda |
| 6,598,468 B2 | 7/2003 | Zur Loye et al. |
| 6,662,781 B1 | 12/2003 | Torno et al. |
| 6,814,054 B2 | 11/2004 | Sauler et al. |
| 6,862,517 B2 | 3/2005 | Galtier |
| 6,885,932 B2 | 4/2005 | Liu et al. |
| 6,912,460 B2 | 6/2005 | Sauler et al. |
| 6,947,829 B2 | 9/2005 | Honda |
| 6,978,771 B2 | 12/2005 | Kuzuyama et al. |
| 6,990,947 B2 | 1/2006 | Kuzuyama et al. |
| 7,021,128 B2 | 4/2006 | Rauchfuss et al. |
| 7,027,909 B2 | 4/2006 | deBotton et al. |
| 7,181,338 B2 | 2/2007 | Takemura et al. |
| 7,191,658 B2 | 3/2007 | Oda et al. |
| 7,212,909 B2 | 5/2007 | Yoshino et al. |
| 7,243,529 B2 | 7/2007 | Takemura et al. |
| 7,246,600 B2 | 7/2007 | Nakashima et al. |
| 7,260,469 B2 | 8/2007 | Birk et al. |
| 7,263,872 B2 | 9/2007 | Danet et al. |
| 7,310,993 B2 | 12/2007 | Popielas et al. |
| 7,325,529 B2 | 2/2008 | Ancimer et al. |
| 7,356,404 B2 | 4/2008 | Takemura et al. |
| 7,376,506 B2 | 5/2008 | Schueler |
| 7,383,816 B2 | 6/2008 | Zurlo |
| 7,444,231 B2 | 10/2008 | Ancimer et al. |
| 7,444,236 B2 | 10/2008 | Wiles |
| 7,448,254 B2 | 11/2008 | Kurtz et al. |
| 7,546,198 B2 | 6/2009 | Remelman |
| 7,559,230 B2 | 7/2009 | Zimmer |
| 7,571,640 B2 | 8/2009 | Andrews |
| 7,628,253 B2 | 12/2009 | Jin et al. |
| 7,669,582 B2 | 3/2010 | Huang |
| 7,712,450 B2 | 5/2010 | Sato et al. |
| 7,747,380 B2 | 6/2010 | Chauvin et al. |
| 7,810,469 B2 | 10/2010 | Vigild et al. |
| 7,823,561 B2 | 11/2010 | Omuro et al. |
| 8,000,884 B2 | 8/2011 | Aso et al. |
| 8,032,293 B2 | 10/2011 | Binder et al. |
| 8,069,972 B2 | 11/2011 | Auclair et al. |
| 8,078,389 B2 | 12/2011 | Huang et al. |
| 8,079,261 B2 | 12/2011 | Crickmore et al. |
| 8,108,131 B2 | 1/2012 | Huang et al. |
| 8,155,857 B2 | 4/2012 | Loeffler et al. |
| 8,250,905 B2 | 4/2012 | Schneider et al. |
| 8,260,531 B2 | 9/2012 | Yasuda |
| 8,316,824 B2 | 11/2012 | Hagari et al. |
| 8,342,011 B2 | 1/2013 | Galtier et al. |
| 8,359,909 B2 | 1/2013 | Duval et al. |
| 8,396,649 B2 | 3/2013 | Huang |
| 8,463,533 B2 | 6/2013 | Glugla et al. |
| 8,499,623 B2 | 8/2013 | Duval et al. |
| 8,528,521 B2 | 9/2013 | Landsmann et al. |
| 8,538,666 B2 | 9/2013 | Buslepp et al. |
| 8,606,484 B2 | 12/2013 | Ohata |
| 8,627,800 B2 | 1/2014 | Glugla et al. |
| 8,639,432 B2 | 1/2014 | Matsuo et al. |
| 8,680,707 B2 | 3/2014 | Childs et al. |
| 8,677,975 B2 | 8/2014 | Muhammad et al. |
| 8,849,471 B2 | 9/2014 | Daniel et al. |
| 2006/0086177 A1 | 4/2006 | Okubo et al. |
| 2013/0151122 A1 | 6/2013 | Jin et al. |
| 2013/0211694 A1 | 8/2013 | Taglialatela et al. |
| 2014/0207062 A1* | 7/2014 | Eagle ............... A61B 5/02141 604/111 |

FOREIGN PATENT DOCUMENTS

| | | |
|---|---|---|
| EP | 1400671 A2 | 3/2004 |
| EP | 1447654 | 8/2004 |
| EP | 1698775 | 6/2006 |
| EP | 1840360 | 3/2007 |
| EP | 1988378 | 5/2008 |
| EP | 2128409 | 2/2009 |
| EP | 2128410 | 2/2009 |
| EP | 2202504 A1 | 6/2010 |
| EP | 2433355 | 3/2012 |
| EP | 2500705 | 9/2012 |
| WO | WO2008000568 | 1/2008 |
| WO | WO2008059376 | 5/2008 |
| WO | WO2009106557 | 9/2009 |
| WO | WO2013015372 | 1/2013 |
| WO | WO2013026950 | 2/2013 |
| WO | WO2013118151 | 8/2013 |

OTHER PUBLICATIONS

U.S. Appl. No. 14/644,526, filed Mar. 11, 2015, Jeffrey Jacob Bizub.
U.S. Appl. No. 14/657,817, filed Mar. 13, 2015, Jeffrey Jacob Bizub.
U.S. Appl. No. 14/676,733, filed Apr. 1, 2015, Jeffrey Jacob Bizub.
U.S. Appl. No. 14/686,350, filed Apr. 14, 2015, Maruthi Narasinga Rao Devarakonda.
U.S. Appl. No. 14/695,335, filed Apr. 24, 2015, Jeffrey Jacob Bizub.
U.S. Appl. No. 14/705,081, filed May 6, 2015, Scott K. Mann.
U.S. Appl. No. 14/745,986, filed Jun. 22, 2015, Sandro Rivellini.
U.S. Appl. No. 14/754,128, filed Jun. 29, 2015, Jeffey Jacob Bizub.
U.S. Appl. No. 14/790,785, filed Jul. 2, 2015, Pavan Chakravarthy Nandigama.
U.S. Appl. No. 14/796,934, filed Jul. 10, 2015, Jeffrey Jacob Bizub.
U.S. Appl. No. 14/820,156, filed Aug. 6, 2015, Jeffrey Jacob Bizub.
U.S. Appl. No. 14/918,013, filed Oct. 20, 2015, Venkatesh Raman.
U.S. Appl. No. 14/320,101, filed Jun. 30, 2014, Ryan Thomas Smith.
U.S. Appl. No. 14/587,407, filed Dec. 31, 2014, Jeffrey Jacob Bizub.
U.S. Appl. No. 14/587,412, filed Dec. 31, 2014, Jerry Jacob Bizub.
U.S. Appl. No. 14/587,434, filed Dec. 31, 2014, Jeffrey Jacob Bizub.
U.S. Appl. No. 14/591,192, filed Jan. 7, 2015, Jeffrey Jacob Bizub.
U.S. Appl. No. 14/592,547, filed Jan. 8, 2015, Jeffrey Jacob Bizub.
U.S. Appl. No. 14/600,674, filed Jan. 20, 2015, Scott K. Mann.
U.S. Appl. No. 14/609,416, filed Jan. 29, 2015, Jeffrey Jacob Bizub.
U.S. Appl. No. 14/614,237, filed Feb. 4, 2015, Pin Zeng.
U.S. Appl. No. 14/617,458, filed Feb. 9, 2015, Jeffrey Jacob Bizub.
U.S. Appl. No. 14/621,028, filed Feb. 15, 2015, Jeffrey Jacob Bizub.
Reduction Piston Slap Excitation by Optimizing Piston Profiles; Takayuki Koizumi et al,; Proc. of 2002 IMAC-XX: Conf. & Exposition on Structural Dynamics, Jun. 12-15, 2000.
VE Piston Dynamics; FEV Group, Inc.; available online; www.fev.com/what-we-do/software/virtual-engine-powertrain-dynamics-simulation/piston-dynamics-module; Jan. 1, 2015.
Diagnostic Internal Combustion Engine Based on Crankshaft Angular Acceleration; Binh Le Khac, Tuma J.; available online; www.researchgate.net, May 2012.
Bolt loosening detection using vibration characteristics of thin plate with piezoelectric elements;Takeshi Nakahara et al; Proc.of SPIE 5391, Smart Struc. & Materials, Jul. 2004.
European Search Report and Opinion issued in connection with corresponding EP Application No. 16156064.4 dated Jul. 15, 2016.

* cited by examiner

METHOD AND SYSTEM TO DETERMINE LOCATION OF PEAK FIRING PRESSURE

BACKGROUND

The subject matter disclosed herein relates generally to knock sensors, and more specifically, to recording signals from knock sensors mounted to large, multi-cylinder reciprocating devices (e.g., combustion engines, compressors, etc.).

Combustion engines typically combust a carbonaceous fuel, such as natural gas, gasoline, diesel, and the like, and use the corresponding expansion of high temperature and pressure gases to apply a force to certain components of the engine, e.g., piston disposed in a cylinder, to move the components over a distance. Each cylinder may include one or more valves that open and close correlative with combustion of the carbonaceous fuel. For example, an intake valve may direct an oxidizer such as air into the cylinder, which is then mixed with fuel and combusted. Combustion fluids, e.g., hot gases, may then be directed to exit the cylinder via an exhaust valve. Accordingly, the carbonaceous fuel is transformed into mechanical motion, useful in driving a load. For example, the load may be a generator that produces electric power.

In order to optimize performance of the engine, it would be desirable to know a location of peak firing pressure. The peak firing pressure can be used by engine designers and control experts to optimize various engine operating parameters. Accordingly, there is a need to find the location of peak firing pressure in engines.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, an engine control an electronic device configured to receive a knock signal from a knock sensor of an engine having a crank shaft includes a processor operatively coupled to a memory, wherein the processor is configured to access the knock signal received from the knock sensor of the engine, determine a location of peak firing pressure based at least in part on the knock signal, wherein the location of peak firing pressure is associated with combustion of the engine and corresponds to a time or a crank angle of the crankshaft, and generate an indication of the location of peak firing pressure.

In a second embodiment, a method for an electronic device to determine peak firing pressure of a cylinder of an engine having a crank shaft includes accessing a knock signal received from a knock sensor of the cylinder, determining a location of peak firing pressure based at least in part on the knock signal, wherein the location of peak firing pressure is associated with combustion of the engine and corresponds to a time or a crank angle of the crankshaft, and generating an indication of the location of peak firing pressure.

In a third embodiment, a tangible, non-transitory computer-readable medium comprising instructions is configured to be executed by a processor, the instructions comprising instructions to access a knock signal received from a knock sensor of a cylinder of an engine having a crankshaft, determine a location of peak firing pressure based at least in part on the knock signal, wherein the location of peak firing pressure is associated with combustion of the engine and corresponds to a time or a crank angle of the crankshaft, and generate an indication of the location of peak firing pressure.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The techniques described herein may be utilized with a wide variety of reciprocating devices, such as engines (e.g., internal combustion engines) and compressors. For instance, techniques described herein apply to spark ignited and diesel (compression ignition) engines, as well as hybrid dual-fuel engines and HCCI engines. A variety of components may be used in conjunction with engines. For example, an engine may be equipped with an in-cylinder pressure transducer that is used to find a location of peak firing pressure for a particular cylinder. However, pressure transducers can be expensive, require maintenance, and have a short operational life. For the foregoing reasons, there is a need for a better, more cost effective, more durable, low maintenance way to determine the location of peak firing pressure.

Figure 1:
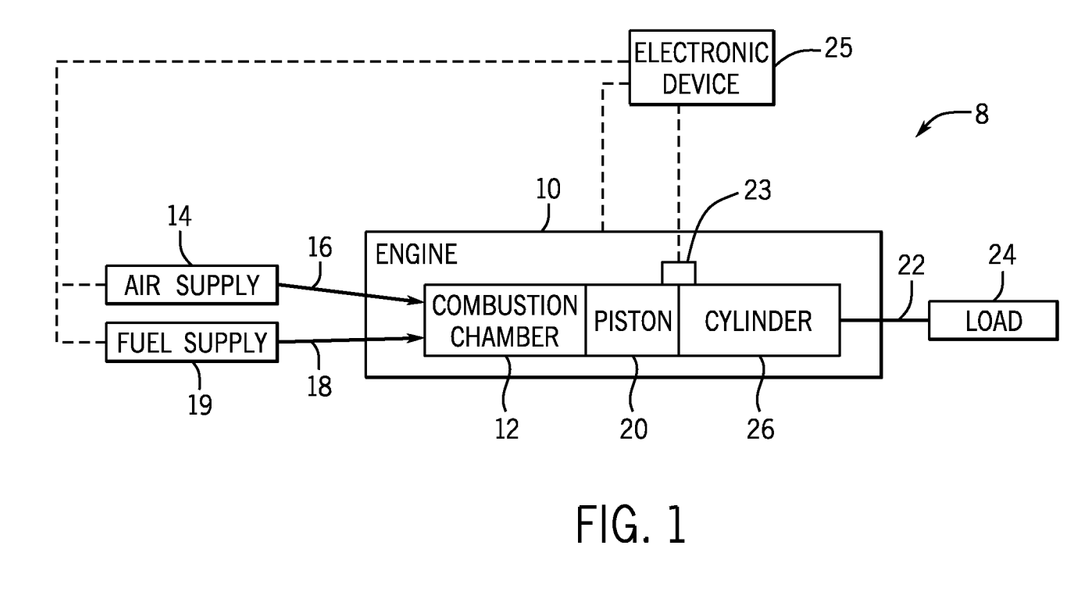
FIG. 1 is a block diagram of an embodiment of an engine driven power generation system with a knock sensor and an electronic device, in accordance with aspects of the present disclosure.

Turning to the drawings, FIG. 1 illustrates a block diagram of an embodiment of a portion of an engine driven power generation system 8. As described in detail below, the system 8 includes an engine 10 (e.g., a reciprocating internal combustion engine) having one or more combustion chambers 12 (e.g., 1, 2, 3, 4, 5, 6, 7, 8, 10, 12, 14, 16, 18, 20, or more combustion chambers 12). While the system 8 includes an engine in FIG. 1, the techniques described herein can be applied to other types of reciprocating devices as well. An air supply 14 is configured to provide a pressurized oxidant 16, such as air, oxygen, oxygen-enriched air, oxygen-reduced air, or any combination thereof, to each combustion chamber 12. The combustion chamber 12 is also configured to receive a fuel 18 (e.g., a liquid and/or gaseous fuel) from a fuel supply 19, and a fuel-air mixture ignites and combusts within each combustion chamber 12. The hot pressurized combustion gases cause a piston 20 adjacent to each combustion chamber 12 to move linearly within a cylinder 26 and convert pressure exerted by the gases into a rotating motion, which causes a shaft 22 to rotate. Further, the shaft 22 may be coupled to a load 24, which is powered via rotation of the shaft 22. For example, the load 24 may be any suitable device that may generate power via the rotational output of the system 10, such as an electrical generator. Additionally, although the following discussion refers to air as the oxidant 16, any suitable oxidant may be used with the disclosed embodiments. Similarly, the fuel 18 may be any suitable gaseous fuel, such as natural gas, associated petroleum gas, propane, biogas, sewage gas, landfill gas, coal mine gas, for example.

The system 8 disclosed herein may be adapted for use in stationary applications (e.g., in industrial power generating engines) or in mobile applications (e.g., in cars or aircraft). The engine 10 may be a two-stroke engine, three-stroke engine, four-stroke engine, five-stroke engine, or six-stroke engine. The engine 10 may also include any number of combustion chambers 12, pistons 20, and associated cylinders (e.g., 1-24). For example, in certain embodiments, the system 8 may include a large-scale industrial reciprocating engine having 4, 6, 8, 10, 16, 24 or more pistons 20 reciprocating in cylinders. In some such cases, the cylinders and/or the pistons 20 may have a diameter of between approximately 13.5-34 centimeters (cm). In some embodiments, the cylinders and/or the pistons 20 may have a diameter of between approximately 10-40 cm, 15-25 cm, or about 15 cm. The system 10 may generate power ranging from 10 kW to 10 MW. In some embodiments, the engine 10 may operate at less than approximately 1800 revolutions per minute (RPM). In some embodiments, the engine 10 may operate at less than approximately 2000 RPM, 1900 RPM, 1700 RPM, 1600 RPM, 1500 RPM, 1400 RPM, 1300 RPM, 1200 RPM, 1000 RPM, 900 RPM, or 750 RPM. In some embodiments, the engine 10 may operate between approximately 750-2000 RPM, 900-1800 RPM, or 1000-1600 RPM. In some embodiments, the engine 10 may operate at approximately 1800 RPM, 1500 RPM, 1200 RPM, 1000 RPM, or 900 RPM. Exemplary engines 10 may include General Electric Company's Jenbacher Engines (e.g., Jenbacher Type 2, Type 3, Type 4, Type 6 or J920 FleXtra) or Waukesha Engines (e.g., Waukesha VGF, VHP, APG, 275GL), for example.

The driven power generation system 8 may include one or more knock sensors 23 suitable for detecting engine "knock." The knock sensor 23 may sense vibrations caused by the engine, such as vibration due to detonation, pre-ignition, and or pinging. The knock sensor 23 is shown communicatively coupled to an electronic device 25, such as an engine control unit (ECU), a workstation, or the like. During operations, signals from the knock sensor 23 are communicated to the electronic device 25 to determine if knocking conditions (e.g., pinging) exist. The electronic device 25 may then adjust certain engine parameters to ameliorate or eliminate the knocking conditions. For example, the electronic device 25 may adjust ignition timing and/or adjust boost pressure to eliminate the knocking. As further described herein, the knock sensor 23 may additionally derive that certain vibrations should be further analyzed and categorized to detect, for example, undesired engine conditions.

Figure 2:
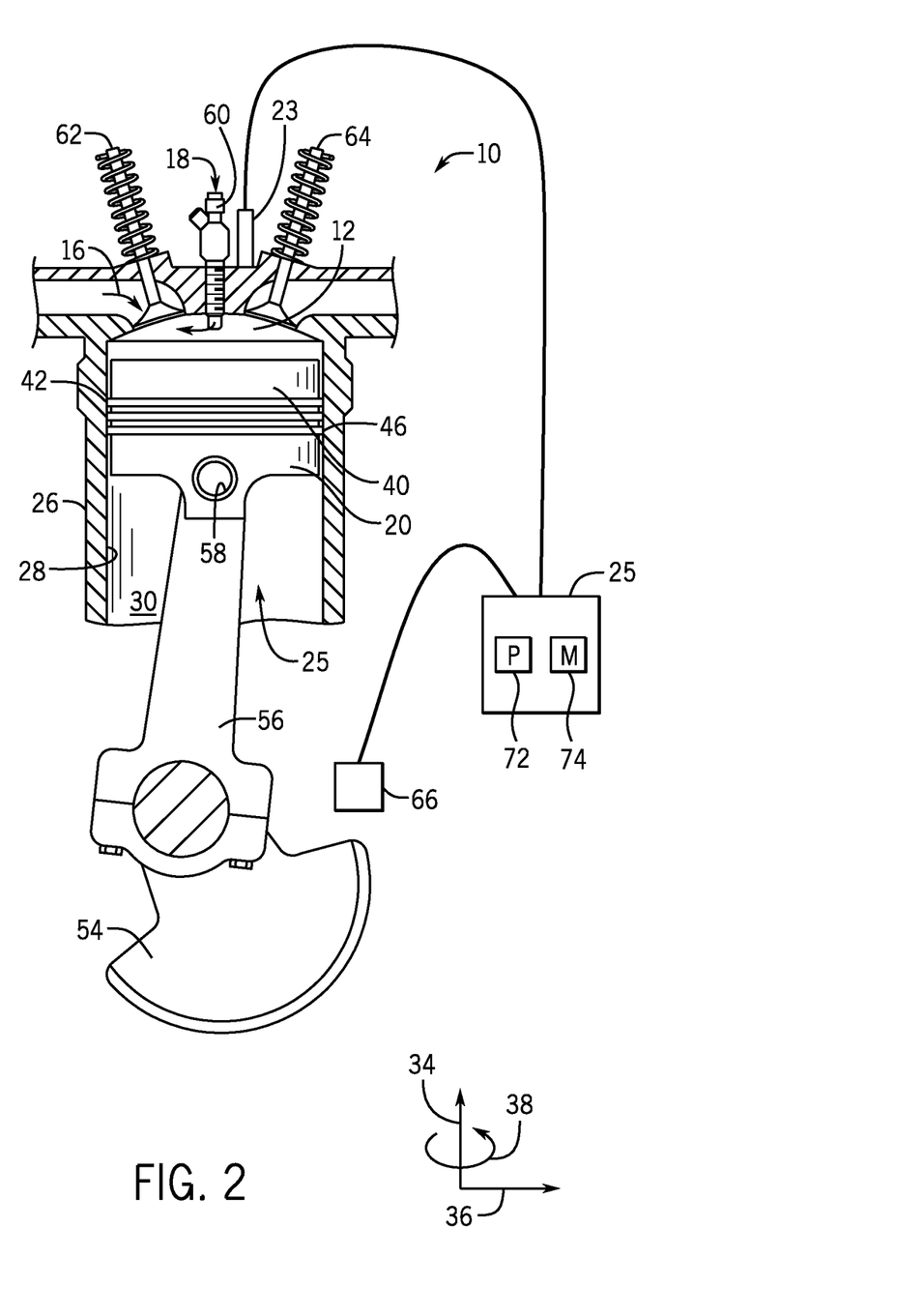
FIG. 2 is a side cross-sectional view of an embodiment of a piston assembly, in accordance with aspects of the present disclosure.

FIG. 2 is a side cross-sectional view of an embodiment of a piston assembly 25 having a piston 20 disposed within a cylinder 26 (e.g., an engine cylinder) of the reciprocating engine 10. The cylinder 26 has an inner annular wall 28 defining a cylindrical cavity 30 (e.g., bore). The piston 20 may be defined by an axial axis or direction 34, a radial axis or direction 36, and a circumferential axis or direction 38. The piston 20 includes a top portion 40 (e.g., a top land). The top portion 40 generally blocks the fuel 18 and the air 16, or a fuel-air mixture 32, from escaping from the combustion chamber 12 during reciprocating motion of the piston 20.

As shown, the piston 20 is attached to a crankshaft 54 via a connecting rod 56 and a pin 58. The crankshaft 54 translates the reciprocating linear motion of the piston 24 into a rotating motion. As the piston 20 moves, the crankshaft 54 rotates to power the load 24 (shown in FIG. 1), as discussed above. As shown, the combustion chamber 12 is positioned adjacent to the top land 40 of the piston 24. A fuel injector 60 provides the fuel 18 to the combustion chamber 12, and an intake valve 62 controls the delivery of air 16 to the combustion chamber 12. An exhaust valve 64 controls discharge of exhaust from the engine 10. However, it should be understood that any suitable elements and/or techniques for providing fuel 18 and air 16 to the combustion chamber 12 and/or for discharging exhaust may be utilized, and in some embodiments, no fuel injection is used. In operation, combustion of the fuel 18 with the air 16 in the combustion chamber 12 cause the piston 20 to move in a reciprocating manner (e.g., back and forth) in the axial direction 34 within the cavity 30 of the cylinder 26.

During operations, when the piston 20 is at the highest point in the cylinder 26 it is in a position called top dead center (TDC). When the piston 20 is at its lowest point in the cylinder 26, it is in a position called bottom dead center (BDC). As the piston 20 moves from top to bottom or from bottom to top, the crankshaft 54 rotates one half of a revolution. Each movement of the piston 20 from top to bottom or from bottom to top is called a stroke, and engine 10 embodiments may include two-stroke engines, three-stroke engines, four-stroke engines, five-stroke engine, six-stroke engines, or more.

During engine 10 operations, a sequence including an intake process, a compression process, a power process, and an exhaust process typically occurs. The intake process enables a combustible mixture, such as fuel and air, to be pulled into the cylinder 26, thus the intake valve 62 is open and the exhaust valve 64 is closed. The compression process compresses the combustible mixture into a smaller space, so both the intake valve 62 and the exhaust valve 64 are closed. The power process ignites the compressed fuel-air mixture, which may include a spark ignition through a spark plug system, and/or a compression ignition through compression heat. The resulting pressure from combustion then forces the piston 20 to BDC. The exhaust process typically returns the piston 20 to TDC while keeping the exhaust valve 64 open. The exhaust process thus expels the spent fuel-air mixture through the exhaust valve 64. It is to be noted that more than one intake valve 62 and exhaust valve 64 may be used per cylinder 26.

The depicted engine 10 also includes a crankshaft sensor 66, the knock sensor 23, and the electronic device 25, which includes a processor 72 and memory 74. The crankshaft sensor 66 senses the position and/or rotational speed of the crankshaft 54. Accordingly, a crank angle or crank timing information may be derived. That is, when monitoring combustion engines, timing is frequently expressed in terms of crankshaft 54 angle. For example, a full cycle of a four stroke engine 10 may be measured as a 720° cycle. The knock sensor 23 may be a Piezo-electric accelerometer, a microelectromechanical system (MEMS) sensor, a Hall effect sensor, and/or any other sensor designed to sense vibration, acceleration, sound, and/or movement.

Because of the percussive nature of the engine 10, the knock sensor 23 may be capable of detecting signatures even when mounted on the exterior of the cylinder 26. However, the knock sensor 23 may be disposed at various locations in or about the cylinder 26. Additionally, in some embodiments, a single knock sensor 23 may be shared, for example, with one or more adjacent cylinders 26. In other embodiments, each cylinder 26 may include one or more knock sensors 23. The crankshaft sensor 66 and the knock sensor 23 are shown in electronic communication with the electronic device 25.

The electronic device (e.g., engine control unit or workstation) may include a processor 72 or multiple processors, a memory 74, and inputs/outputs (i.e., I/O). The processor 72 may include multiple microprocessors, one or more "general-purpose" microprocessors, one or more special-purpose microprocessors, and/or one or more application specific integrated circuits (ASICS), system-on-chip (SoC) device, or some other processor configuration. For example, the processor 58 may include one or more reduced instruction set (RISC) processors or complex instruction set (CISC) processors. The processor 72 may be operatively coupled to the memory 74 to execute instructions stored in the memory 74 for carrying out the presently disclosed techniques. These instructions may be encoded in programs or code stored in a tangible non-transitory computer-readable medium, such as the memory 74 and/or other storage. The memory 74, in the embodiment, includes a computer readable medium, such as, without limitation, a hard disk drive, a solid state drive, diskette, flash drive, a compact disc, a digital video disc, random access memory (RAM and/or flash RAM), and/or any suitable storage device that enables the processor 72 to store, retrieve, and/or execute instructions (e.g., software or firmware for determining the location of peak firing pressure) and/or data (e.g., knock sensor signals). Additionally, the electronic device 25 may monitor and control operation of the engine 10, for example, by adjusting combustion timing, valve 62, 64, timing, adjusting the delivery of fuel and oxidant (e.g., air), and so on. The processor 72 of the electronic device 25 can access the knock signals received from the knock sensor 23. As will be appreciated, the processor 72 may be configured to determine a location of peak firing pressure.

Figure 3:
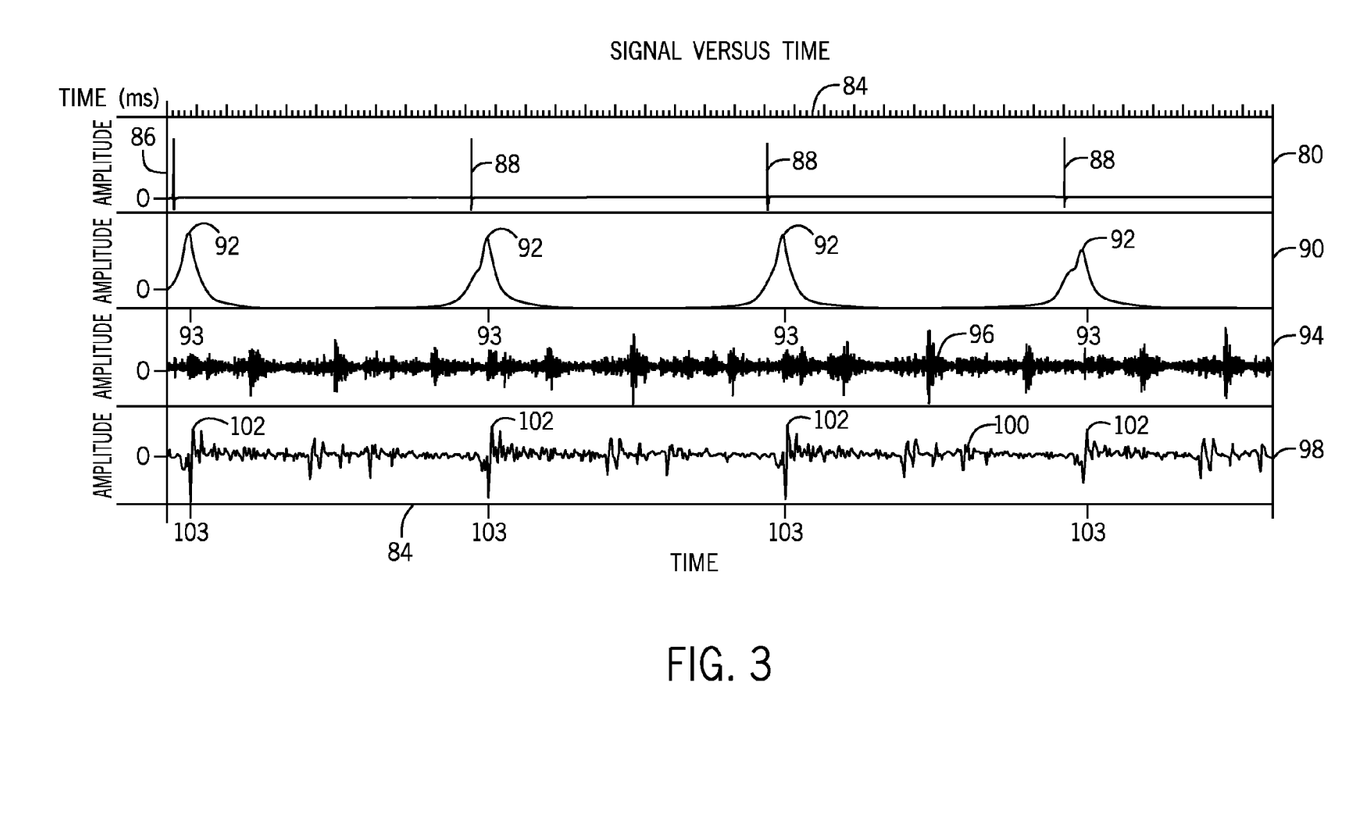
FIG. 3 is a series of sample plots using a filtering approach with signal amplitudes plotted against time or crank angle from the knock sensor of FIG. 1, in accordance with aspects of the present disclosure.
Figure 4:
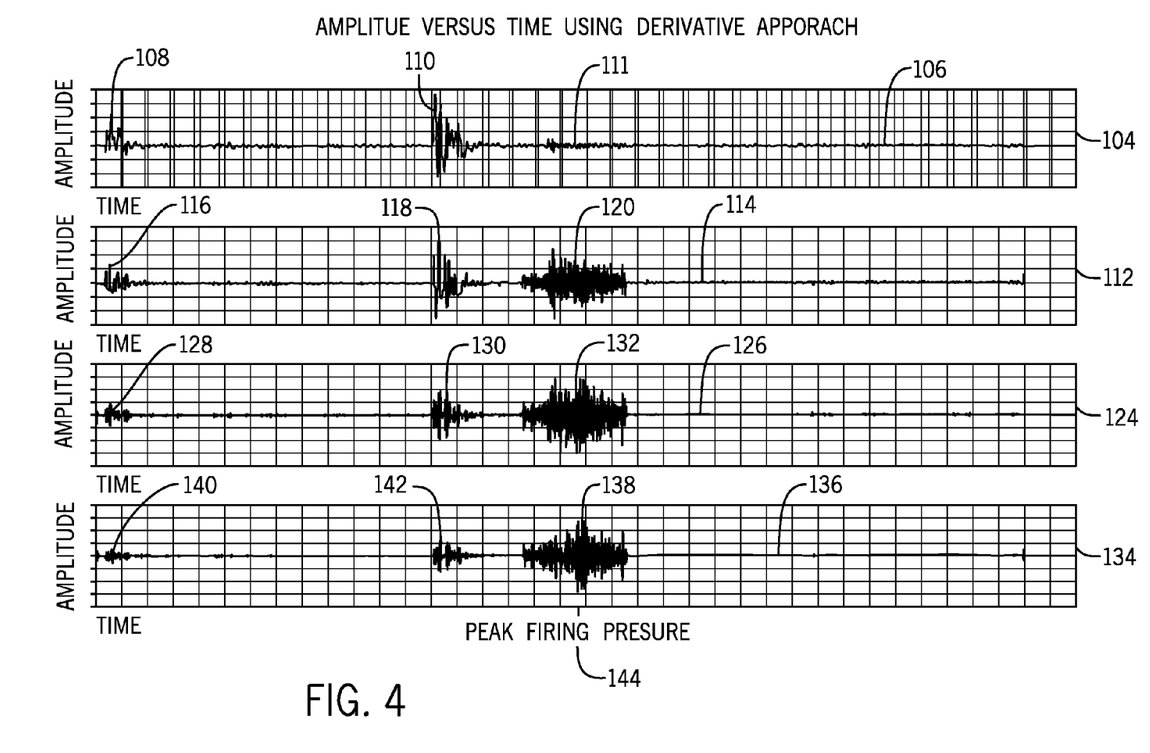
FIG. 4 is a series of sample plots using a derivative approach with signal amplitudes plotted against time or crank angle from the knock sensor of FIG. 1, in accordance with aspects of the present disclosure.

FIG. 3 is a series of diagrams with signal amplitudes derived from signals received from a knock sensor plotted against time. While the plots of FIGS. 3 and 4 are shown, the plots are meant to be illustrative, and the processor 72 of the electronic device 25 may simply process the data as described below without generating similar plots. The analysis below may be performed by the processor 72 (e.g., running code) for the processor 72 to determine the location of peak firing pressure. The steps described in FIGS. 3-5 may be stored in the memory 74 of the electronic device 25 and executed as instructions by the processor 72. Each of the plots of FIG. 3 have time (e.g., in crank angle, milliseconds, or seconds) shown along the x-axis 84, and the plots have amplitude (e.g., amplitude of vibration signals received from the knock sensor 23) along the y-axis 86. The first plot 80 is a sparking diagram that shows the time sparking occurs for the cylinder 26. The sparking occurs at the points 88 in the first plot 80. The second plot 90 shows signals of pressure measurements in cylinder 26 from a pressure transducer. The pressure transducer may be used to determine peak firing pressure in the cylinder 26. As shown in FIG. 3, the pressure transducer receives signals that show the pressure building to the peak firing pressure at points 92. As mentioned above, it is desirable to know the locations 93 of peak firing pressure points 92 for optimizing engine parameters. However, pressure transducers can be expensive and have a short operational life. Accordingly, there is a need for a better way to determine the location of peak firing pressure. In an embodiment of the present disclosure, the knock sensor 23 is utilized in conjunction with the processor 72 to determine the location 93 of peak firing pressure for the cylinder 26.

The third plot 94 of FIG. 3 shows an unfiltered signal 96 from the knock sensor 23 of FIG. 2. The signal may be received by the electronic device 25. The processor 72 of the electronic device 25 may then sample or access the signal (e.g., unfiltered signal 96) received from the knock sensor 23. The processor 72 may then determine the location (in time or crank angle) of peak firing pressure. As described below, the location of peak firing pressure may be determined by filtering or performing derivative or integral analysis. For instance, the processor 72 may determine a resultant signal based on the knock signal by filtering the knock signal, calculating a derivative of the knock signal, calculating an integral of the knock signal, or the like. Further, as described below, the processor 72 may determine a resultant signal peak location corresponding to the location of peak firing pressure of the cylinder.

The processor 72 or other hardware (e.g., low-pass or band-pass filter circuitry) of the electronic device 25 may filter the signal received from the knock sensor 23. For instance, the electronic device 25 may utilize a filter bank (e.g., with one or more low-pass and/or band-pass filters). In an embodiment, the electronic device 25 may utilize the signals below approximately 2 kHz. That is, frequencies above 2 kHz may be attenuated, while frequencies below approximately 2 kHz are allowed to pass. As an example, the electronic device 25 may filter, via the processor 72 or other hardware, the knock signal by applying a 4 pole low pass or band pass filter to the knock signal. The fourth plot 98 shows a filtered signal 100 (e.g., resultant signal) generated by the processor 72 or other hardware of the electronic device 25 based on the unfiltered signal 96 in the third plot 94. The filtered signal 100 has peak amplitudes 102 that correspond with the peak firing pressure as shown by the pressure transducer plot 90. As such, in order to determine the location of peak firing pressure, the processor 72 may find the location 103 of the peak amplitudes 102 of the filtered signal 100 from the knock sensor 23. The location 103 corresponds to the location of peak firing pressure of the cylinder 26, as shown by the locations of peak firing pressure 92 in plot 90. Further, the electronic device 25 may adjust for a delay in filtering the raw signal. As the delay may be built-in and/or predetermined based on the filter, the delay may be a known value. Accordingly, determining the location of peak firing pressure may include adjusting the filtered signal 100 to accommodate (e.g., accounting for an offset) for the delay in filtering the raw signal. Additionally and/or alternatively, the electronic device 25 may be configured to determine the location of peak firing pressure by using derivative or integral analysis.

The processor 72 of the electronic device 25 may be configured to take one or more derivatives of the raw signal data from the knock sensor 23. As mentioned above, the process described with respect to FIG. 4 may be stored in the memory 74 may and executed as instructions by the processor 72. FIG. 4 shows a series of plots of amplitude versus time using a derivative approach. The first plot 104 shows another example of raw signal data 106 from the knock sensor 23. The raw signal may include vibration signals that are not associated with the peak firing pressure, such as vibration signals 108 and 110. Further, the raw signal data includes what appears to be a small amount of noise 111 from combustion. The electronic device 25 may calculate, via the processor 72, a derivative of the raw signal data 106. The second plot 112 of FIG. 4 shows the derivative 114 calculated based on the raw signal data 106 of the first plot 104. As shown in the second plot 112, the derivative 114 of vibration signals 108 and 110 that were not associated with the peak firing pressure have decreased to derivative signals 116 and 118. Further, the first derivative 114 enhanced the small amount of noise 111 associated with combustion in the raw signal data 106 into a more pronounced signal 120. The third plot 124 shows a third derivative 126 of the raw signal data 106 calculated by the processor 72. Similar to the first derivative, the third derivative signals 128 and 130 of vibration signals 108 and 110 has a smaller amplitude than the first derivative signals 116 and 118. Furthermore, the third derivative includes a signal 132 with an even more pronounced amplitude from the combustion process.

The processor 72 may continue to calculate derivatives of the knock sensor 23 data until a ratio of change between the derivatives decreases below a threshold ratio. For example, the fourth plot 134 may be the seventeenth derivative (e.g., resultant signal 136) of the original signal 106. The change between the seventeenth derivative and the sixteenth derivative may be small, as the signals unrelated to combustion continue to decrease in amplitude. Further, the amplitude of the combustion signal 138 saturates (i.e., does not change). Accordingly, as additional derivatives are calculated by the processor 72, the combustion signal 138 is enhanced compared to the other signals while the ratio of change between derivatives decreases. For example, the ratio of change between the sixteenth and seventeenth derivatives may be smaller than the ratio of change between the first and second derivatives. Once the ratio of change decreases below a threshold ratio (e.g., the seventeenth derivative of plot 134), the processor 72 can determine the location of the peak firing pressure of the cylinder 26 by finding the location of peak amplitude. For instance, FIG. 4 shows the location 144 (e.g., in milliseconds or crank angle) of peak firing pressure where the combustion signal 138 is at a maximum.

In another embodiment, the processor 72 of the electronic device 25 (e.g., electronic control unit) may be configured to determine the location of peak firing pressure of the cylinder 26 of the engine 10 by performing integral analysis (i.e. calculating one or more integrals based on the raw sensor data). The process of performing the integral analysis may be stored in the memory 74 may and executed as instructions by the processor 72. In order for the processor 72 to determine the location of peak firing pressure, the processor 72 may square or take the absolute value of the signals from the knock sensor 23 to obtain positive amplitudes. The processor 72 may then proceed to calculate one or more integrals of the signals from the knock sensor 23. The processor 72 may then determine the location of peak firing pressure by finding the location of the peak of the integrated signal. The processor 72 can determine location of the peak of the integrated signal which corresponds to the location (in time or crank angle) of peak firing pressure.

Figure 5:
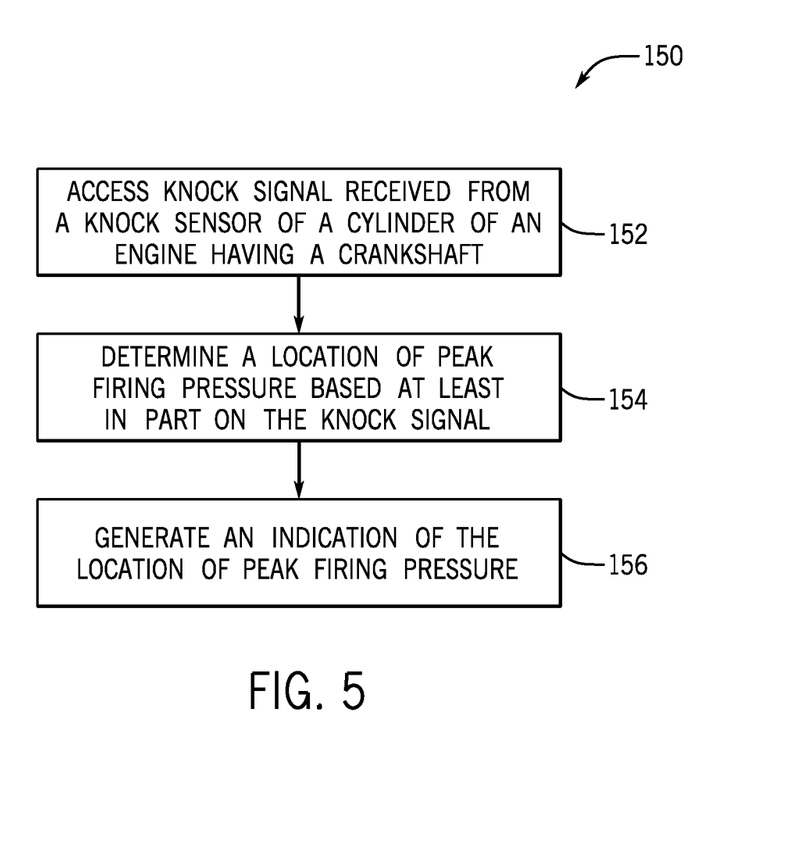
FIG. 5 is a flow chart of a process performed by the processor of the electronic device of FIG. 1, in accordance with aspects of the present disclosure.

FIG. 5 is a flow chart of a process 150 performed by the processor 72 (e.g., running code) of the electronic device 25. The process 150 may be stored in the memory 74 of the electronic device 25 and executed as instructions by the processor 72. The processor 72 may begin by receiving signals from the knock sensor 23 of a cylinder 26 of an engine 10 having a crank shaft 54. The processor 72 may continue by accessing (block 152) knock signals received from a knock sensor 23, such as the unfiltered signal 96 of FIG. 3 or the raw signal data 106 of FIG. 4.

The processor 72 may then determine (block 154) a location of peak firing pressure based at least in part on the knock sensor. In order to find the location, the processor 72 may determine a resultant signal based on the knock signal by filtering the knock signal, calculating one or more derivatives of the knock signal, calculating one or more integrals of the knock signal, or any combination thereof. Filtering the knock signal may performed by using a filter bank (e.g., one or more low pass or band pass filters). The processor 72 may utilize the location of the peak amplitude of the filtered signal (e.g., resultant signal) which corresponds to the location of peak firing pressure. Further, the processor 72 may account for an offset of the location (in time or crank angle) for the filtering time. Alternatively and/or additionally, the processor 72 may calculate one or more derivatives (e.g., resultant signals) of the knock signal. The processor 72 may calculate derivatives until a ratio of change drops below a certain threshold or take a predetermined amount of derivatives. Once the processor 72 takes the derivatives, the processor 72 may utilize the location of peak amplitude of the derivatives which correspond to the location of peak firing pressure in the cylinder 26. Alternatively and/or additionally, the processor 72 may perform integral analysis. The processor 72 may calculate the square or absolute value of the knock signal to, for instance, make the signal positive. The processor 72 may calculate the integral (e.g., find a resultant signal) of the knock signal. The processor 72 may then find the location of the peak of the integral which corresponds to the location of peak firing pressure in the cylinder 26. The processor 72 may then generate (block 156) an indication of the location of peak firing pressure. For instance, the indication may be a value of the location (e.g., a time or crank angle value) of peak firing pressure in the cylinder 26.

Technical effects of the disclosed embodiments relate to generating indications of locations of peak firing pressure in a cylinder of an engine. More particularly, an electronic device may generate an indication of the location of peak firing pressure in the cylinder of the engine by utilizing a knock signal from a knock sensor. An electronic device receives the knock signals from the knock sensor that reads vibration/noise signals from the cylinder of the engine. A processor of the electronic device determines the location (in time or crank angle) of peak firing pressure in the cylinder of the engine during combustion by utilizing the knock signal from the knock sensor. The processor may determine a resultant signal by filtering the knock signal using a low pass or band pass filter. Alternatively and/or additionally, the processor may calculate the derivative or integral of the knock signal as the resultant signal. The location of a peak of the resultant signal may correspond to the location of peak firing pressure. The processor may generate an indication of the location of peak firing pressure, such as an indication of the time or crank angle associated with the peak firing pressure. Then, the location of peak firing pressure can be used to improve engine operative parameters.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. An electronic device configured to receive a knock signal from a knock sensor coupled to an engine having a crank shaft, comprising:
    a processor operatively coupled to a memory, wherein the processor is configured to:
        obtain the knock signal received from the knock sensor of the engine;
        determine a location of peak firing pressure by calculating a plurality of derivatives of the knock signal over a time period, and to determine a location of a maximum amplitude from a final derivative of the plurality of derivatives over the time period as the location of peak firing pressure, wherein the location of peak firing pressure is associated with a combustion process of the engine and corresponds to a time or a crank angle of the crankshaft; and
        outputting an indication of the location of peak firing pressure to improve operation of one or more engine operating parameters.

2. The electronic device of claim 1, wherein the electronic device comprises an engine control unit.

3. The electronic device of claim 1, comprising the engine, wherein the engine comprises an internal combustion engine.

4. The electronic device of claim 1, wherein processor is configured to determine the location of peak firing pressure based at least in part by filtering the knock signal.

5. The electronic device of claim 4, wherein the processor is configured to utilize a filter bank in filtering the knock signal.

6. The electronic device of claim 5, wherein the filter bank comprises a low pass filter, a band pass filter, or any combination thereof.

7. The electronic device of claim 4, wherein the processor is configured to adjust for a delay in filtering the knock signal to determine the location of the peak firing pressure.

8. The electronic device of claim 1, wherein the processor is configured to calculate the a second derivative of the plurality of derivatives from a first derivative of the plurality of derivatives to increase values from the knock signal related to the combustion process and decrease values from the knock signal unrelated to the combustion process.

9. The electronic device of claim 1, wherein a crank angle of the crankshaft at the maximum of a last derivative of the plurality of derivatives is deemed to be the location of peak firing pressure.

10. A method, comprising:
    utilizing a processor to:
        obtain a knock signal received from a knock sensor coupled to an engine having a crank shaft;
        determine a location of peak firing pressure by calculating a plurality of derivatives of the knock signal over a time period, and to determine a location of a maximum from a final derivative of the plurality of derivatives over the time period as the location of peak firing pressure, wherein the location of peak firing pressure is associated with a combustion process of the engine and corresponds to a time or a crank angle of the crankshaft; and
    outputting an indication of the location of peak firing pressure to improve operation of one or more engine operating parameters of the engine.

11. The method of claim 10, comprising utilizing the processor to generate a resultant signal by filtering the knock signal.

12. One or more non-transitory computer-readable media encoding one or more processor-executable routines, wherein the one or more routines, when executed by a processor, cause acts to be performed comprising:
    obtaining a knock signal received from a knock sensor coupled to an engine having a crank shaft;
    determining a location of peak firing pressure by calculating a plurality of derivatives of the knock signal over a time period, and to determine a location of a maximum from a final derivative of the plurality of derivatives over the time period as the location of peak firing pressure, wherein the location of peak firing pressure is associated with combustion of the engine and corresponds to a time or a crank angle of the crankshaft; and
    outputting an indication of the location of peak firing pressure to improve operation of one or more engine parameters of the engine.

13. The non-transitory computer-readable medium of claim 1, wherein peak firing pressure corresponds to a highest pressure that occurred in a cylinder of the engine during combustion.

14. The non-transitory computer-readable medium of claim 12, wherein the acts to be performed comprise determining a resultant signal based on the knock signal by filtering the knock signal.

15. The electronic device of claim 1, wherein the final derivative of the plurality of derivatives comprises a sixteenth derivative.

16. The electronic device of claim 1, comprising the knock sensor.

17. The electronic device of claim 1, wherein the knock sensor is configured to be mounted to a cylinder of the engine.

18. The electronic device of claim 9, wherein the knock signal comprises a vibration signal.

19. The electronic device of claim 1, wherein the processor is configured to calculate a predetermined number of derivatives to reduce portions of the knock signal unrelated to the combustion process.

20. The method of claim 10, comprising obtaining the knock signal from the knock sensor mounted to an exterior of a cylinder of the engine.

* * * * *